United States Patent [19]

Nanbu et al.

[11] Patent Number: 5,399,607

[45] Date of Patent: * Mar. 21, 1995

[54] ONE COMPONENT COMPOSITION CONTAINING A CATALYST AND HAVING INCREASED STORABILITY

[75] Inventors: Toshiro Nanbu, Kobe; Hirotoshi Kawaguchi, Akashi; Yasushi Kato; Hisao Furukawa, both of Kobe, all of Japan

[73] Assignee: Kanegafuchi Kagaku Kogyo Kabushiki Kaisha, Osaka, Japan

[*] Notice: The portion of the term of this patent subsequent to Nov. 5, 2008 has been disclaimed.

[21] Appl. No.: 189,710

[22] Filed: Feb. 1, 1994

Related U.S. Application Data

[63] Continuation of Ser. No. 836,291, Feb. 27, 1992, abandoned, and a continuation-in-part of Ser. No. 947,957, Sep. 21, 1992, and a continuation of Ser. No. 13,186, Jan. 29, 1993, Pat. No. 5,344,880, which is a continuation of Ser. No. 505,394, Apr. 6, 1990, abandoned, said Ser. No. 947,957, is a continuation of Ser. No. 582,841, Oct. 9, 1990, abandoned.

[30] Foreign Application Priority Data

Feb. 10, 1989 [JP] Japan ..................... 1-32480
Apr. 6, 1989 [JP] Japan ..................... 1-87733
Jun. 28, 1990 [JP] Japan ..................... 2-171759

[51] Int. Cl.$^6$ ................. C08K 5/05; C08F 230/08
[52] U.S. Cl. ......................... 524/385; 524/379; 524/389; 525/288; 525/326.5; 525/342

[58] Field of Search .............. 524/379, 385, 389; 525/288, 326.5, 342, 279

[56] References Cited

U.S. PATENT DOCUMENTS

4,503,181  3/1985  Kato et al. ................. 524/391
4,578,417  3/1986  Furukawa et al. .......... 525/326.5
5,063,114  11/1991 Nambu et al. ............... 525/103

*Primary Examiner*—Peter A. Szekely
*Attorney, Agent, or Firm*—Varndell Legal Group

[57] ABSTRACT

A one component composition suitable for use as coatings which are excellent in storage stability and coating workability, which comprises:

(A) an acrylic resin having hydroxyl group,
(B) an alkoxysilyl group-containing acrylic copolymer having a group represented by the formula:

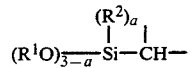

wherein $R^1$ is an alkyl group having 1 to 10 carbon atoms, $R^2$ is a hydrogen atom or a monovalent hydrocarbon group having 1 to 10 carbon atoms selected from the group consisting of an alkyl group, an aryl group and an aralkyl group, and a is 0, 1 or 2,
(C) a curing catalyst, and
at least one member selected from the group consisting of (D) a dehydrating agent and (E) an alkyl alcohol.

16 Claims, No Drawings

ONE COMPONENT COMPOSITION CONTAINING A CATALYST AND HAVING INCREASED STORABILITY

CROSS-REFERENCES TO RELATED APPLICATIONS

This application is a continuation of U.S. Ser. No. 07/836,291, filed Feb. 27, 1992, now abnadoned, which is a U.S. national phase application of PCT/JP91/00448, filed Apr. 3, 1991. This application is a continuation-in-part of U.S. Ser. No. 07/947,957, filed Sep. 21, 1992, which is a continuation application of U.S. Ser. No. 07/582,841, filed Oct. 9, 1990, now abandoned, which is U.S. national phase application of PCT/JP90/00152, filed Feb. 7, 1990. This application is also a continuation application of U.S. Ser. No. 08/013,186, filed Jan. 29, 1993, now U.S. Pat. No. 5,344,880, which is a continuation application of U.S. Ser. No. 07/505,394, filed Apr. 6, 1990, now abandoned.

TECHNICAL FIELD

The present invention relates to a one component composition which is used for various coatings such as coatings for outer walls of buildings, automobiles, industrial machines, steel furnitures, household electric appliances and plastics, especially, for coatings applied to uses requiring to have an excellent durability.

BACKGROUND ART

Conventional thermosetting coatings are coatings which use as a crosslinking agent a melamine such as an alkyd melamine, an acrylic melamine or an epoxy melamine. However, these coatings have the problem of bad smelling caused by the melamine resin remains to be solved.

In order to solve these problems, the present inventors found a crosslinking system of a polyol resin and a hydrolyzable silyl group-containing resin which is quite different from a conventional crosslinking system of a polyol resin and a melamine resin, and already filed a patent application (see Japanese Unexamined Patent Publication 1-141952).

However, when such a mixture of the polyol resin and the hydrolyzable silyl group-containing polymer is used without a curing catalyst, the curing speed is slow at room temperature or under heating at a relatively low temperature. Accordingly, it is required to heat the mixture at a high temperature when it is desired to coat and cure at a high speed, requiring consumption of a large amount of energy.

Such disadvantages can be, generally, improved by admixing a curing catalyst just before the use of the coating composition, whereby the curing speed of the coating film is increased even at a relatively low temperature. However, after admixing the curing catalyst once, such compositions (which are generally called a "two component composition"), which are used as a paint, coating agent, adhesive, secant, coupling agent and the like, cannot be stored, since the compositions are cured in a short period of time. Accordingly, the unused portion of the coating composition comes to no use.

When it is desired to form a film utilizing a siloxy-crosslinking owing to a reaction of hydroxyl group of an acrylic resin having a hydroxyl group with an alkoxysilyl group of an alkoxysilyl group-containing acrylic copolymer, a composition is required to contain an acrylic resin having enough hydroxyl groups to sufficiently crosslink. In such a case, the hydroxyl groups and the alkoxysilyl groups are gradually reacted even in absence of a catalyst, thus resulting in gelation. Much less, it is technically difficult to stably store the composition containing a curing catalyst over several months.

DISCLOSURE OF THE INVENTION

In order to solve these problems, the present inventors have repeated an earnest study. As a result, they have found that mixtures of an acrylic resin having hydroxyl group which contains a curing catalyst and an alkoxysilyl group-containing acrylic copolymer can be made into a one component composition having increased storability by further adding a dehydrating agent and/or an alkyl alcohol; and have accomplished the present invention.

The present invention provides a one component composition comprising:

(A) an acrylic resin having hydroxyl group,
(B) an alkoxysilyl group-containing acrylic copolymer containing a group represented by the general formula:

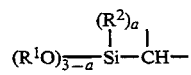

wherein $R^1$ is an alkyl group having 1 to 10 carbon atoms, $R^2$ is a hydrogen atom or a monovalent hydrocarbon group having 1 to 10 carbon atoms selected from the group consisting of an alkyl group, an aryl group and an aralkyl group, and a is 0, 1 or 2, (C) a curing catalyst, and
at least one member selected from the group consisting of (D) a dehydrating agent and (E) an alkyl alcohol.

The composition of the present invention is excellent in storage stability and is excellent in workability upon coating.

The acrylic resin having hydroxyl group used in the present invention which is the component (A) [hereinafter also referred to as "acrylic resin having hydroxyl group (A)"] is a component used for exhibiting film properties such as hardness immediately after curing and solvent resistance. Since its main chain is substantially composed of an acrylic copolymer chain, the weatherability, chemical resistance and water resistance of the cured product are improved.

The acrylic resin having hydroxyl group (A) can be obtained by, for example, copolymerization of a hydroxyl group-containing vinyl monomer with acrylic acid, methacrylic acid or their derivatives.

The reaction of moisture in the composition with the dehydrating agent progresses faster than the reaction of the alkoxysilyl group of the polymer (B) with the moisture, due to the copolymerization of the acidic monomer such as acrylic acid or methacrylic acid, thereby improving the stability of one component composition.

As the hydroxyl group-containing vinyl monomer to be included as the above-mentioned copolymerizable component (A), there are exemplified, for instance, 2-hydroxyethyl (meth)acrylate, 2-hydroxypropyl (meth)acrylate, 2-hydroxyethyl vinyl ether, N-methylol (meth)acrylamide, Aronix 5700 made by Toagosei Chemical Industry Co., Ltd., 4-hydroxyl styrene, HE- 10, HE-20, HP-10 and HP-20 which are products made by Nippon Shokubai Kagaku Kogyo Kabushiki Kaisha ( which are acrylate oligomers having hydroxyl group at the oligomer end), Blenmer PP series (polypropylene glycol methacrylate), Blenmer PE serives (polyethylene glycol monomethacrylate), Blenmer PEP serives (polyethylene glycol polypropylene glycol methacrylate), Blenmer AP-400 (polypropylene glycol monoacrylate), Blenmer AE-350 (polyethylene glycol monoacrylate), Blenmer NKH-5050 (polypropylene glycol polytrimethylene monoacrylate) and Blenmer GLM (glycerol monomethacrylate), which are products made by Nippon Yushi Kabushiki Kaisha, an ε-caprolactone-modified hydroxyalkyl vinyl monomer obtained by reaction of a hydroxyl group-containing vinyl compound with ε-caprolactone, and the like.

As typical examples of the ε-caprolactone-modified hydroxyalkyl vinyl monomers, there are exemplified, for instance, monomers having a structure represented by the formula:

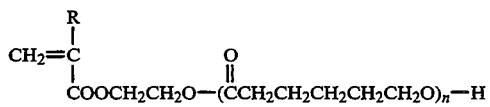

wherein R is H or CH$_3$ and n is an integer of not less than one, such as Placcel FA-1 (R=H, n=1), Placcel FA-4 (R=H, n=4), Placcel FM-1 (R=CH$_3$, n=1) and Placcel FM-4 (R=CH$_3$, n=4) which are products made by Daicel Chemical Industries, Ltd., TONE M-100 (R=H, n=2) and TONE M-201 (R=CH$_3$, n=1) which are products made by UCC, and the like. By using the ε-caprolactone-modified hydroxyalkyl vinyl monomer as the hydroxyl group-containing vinyl monomer, the impact resistance and the flexibility of the coating film can be improved.

These hydroxyl group-containing vinyl monomers may be used alone or as a mixture thereof.

The derivatives of acrylic acid or methacrylic acid copolymerizable with the hydroxyl group-containing vinyl monomer are not particularly limited. As representative examples, there are exemplified, for instance, methyl (meth)acrylate, ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, α-ethyl (meth)acrylamide, N-butoxymethyl (meth)acrylamide, N,N-dimethyl acrylamide, N-methyl acrylamide, acryloyl morpholine, N-methylol (meth)acrylamide, AS-6, AN-6, AA-6, AB-6 and AK-5, which are macromers made by Toagosei Chemical Industry Co., Ltd., a phosphate group-containing vinyl compound which is a condensation product of a hydroxyalkyl ester of α,β-ethylenically unsaturated carboxylic acid such as a hydroxyalkyl ester of (meth)acrylic acid with phosphoric acid or a phosphoric ester, a (meth)acrylate containing an urethane bond or sitoxane bond, and the like.

The copolymer may contain segments formed by an urethane bond or siloxane bond or segments derived from monomers other than (meth)acrylic acid derivatives in its main chain within a range of less than 50% (% by weight, hereinafter the same). The monomers are not limited. Examples of the monomers are, for instance, an aromatic hydrocarbon vinyl compound such as styrene, α-methylstyrene, chlorostyrene, styrenesulfonic acid or vinyl toluene; an unsaturated carboxylic acid such as maleic acid, fumaric acid or itaconic acid, its salt (alkali metal salt, ammonium salt, amine salt), its acid anhydride (maleic anhydride), or an ester of an unsaturated carboxylic acid such as a diester or half ester thereof with a linear or branched alcohol having 1 to 20 carbon atoms; a vinyl ester or an allyl compound such as vinyl acetate, vinyl propionate or diallyl phthalate; an amino group-containing vinyl compound such as vinylpyridine or aminoethyl vinyl ether; an amide group-containing vinyl compound such as itaconic acid diamide, crotonamide, maleic acid diamide, fumaric acid diamide or N-vinylpyrrolidone; other vinyl compounds such as methyl vinyl ether, cyclohexyl vinyl ether, vinyl chloride, vinylidene chloride, chloroprene, propylene, butadiene, isoprene, fluoroolefin maleimide, N-vinylimidazole and vinylsulfonic acid; and the like.

It is preferable that the acrylic resin having hydroxyl group (A) is prepared by solution polymerization using an azo radical polymerization initiator such as azobisisobutyronitrile, because of the easiness of synthesis.

In the solution polymerization, if necessary, a chain transfer agent such as n-dodecyl mercaptane, t-dodecyl mercaptane or n-butyl mercaptane is used, thereby controlling the molecular weight.

Any non-reactive solvents are used without particular limitations as the polymerization solvent. The acrylic resin having hydroxyl group (A) may be used in the state of a solution, or as a non-aqueous dispersion type wherein the insoluble polymer particles are dispersed in a non-polar organic solvent such as heptane or pentane.

The molecular weight of the acrylic resin having hydroxyl group (A) is not particularly limited. It is preferable that the number average molecular weight is from 1,500 to 40,000, more preferably from 3,000 to 25,000, from the viewpoint of the film properties (the properties of the film prepared from the composition of the present invention) such as durability. Also, it is preferable that the resin (A) has enough hydroxyl groups to sufficiently crosslink. It is preferable that the hydroxyl value is from 10 to 300 mg KOH/g, more preferably from 30 to 150 mg KOH/g, from the viewpoint of the film properties such as strength and durability.

Such acrylic resins having hydroxyl group (A) may be used alone or as a mixture thereof.

The alkoxysilyl group-containing acrylic copolymer used in the present invention which is the component (B) [hereinafter also referred to as "alkoxysilyl group-containing acrylic copolymer (B)"] is a polymer having, in one molecule, at least one, preferably not less than two alkoxysilyl groups represented by the formula:

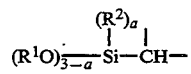

at its ends and/or side chains.

In the above-mentioned formula, R$^1$ is an alkyl group having 1 to 10, preferably from 1 to 4, carbon atoms. When the number of carbon atoms is more than 10, the reactivity of the alkoxysilyl group is lowered. Also, when the group R$^1$ is a group other than the alkyl group, such as phenyl group or benzyl group, the reactivity is lowered. Examples of the groups $R^1$ are, for instance, methyl group, ethyl group, n-propyl group, iso-propyl group, n-butyl group, isobutyl group, and the like.

In the above-mentioned formula, $R^2$ is a hydrogen atom, or a monovalent hydrocarbon group having 1 to 10, preferably from 1 to 4, carbon atoms selected from the group consisting of an alkyl group, an aryl group and an aralkyl group.

Examples of the alkyl groups having 1 to 10 carbon atoms which are one kind of the group $R^2$ are the same groups as the group $R^1$, examples of the aryl groups are, for instance, phenyl group, and examples of the aralkyl groups are, for instance, benzyl group, and the like.

In the above-mentioned formula, a is 0, 1 or 2.

Examples of the alkoxysilyl group represented by the above-mentioned formula are, for instance, groups contained in alkoxysilyl group-containing monomers as mentioned below.

The main chain of the alkoxysilyl group-containing acrylic copolymer (B) is substantially composed of the acrylic copolymer chain, so the cured product is improved in weatherability, chemical resistance, water resistance, and the like. Further, the alkoxysilyl group is bonded to carbon atom, so the cured product is improved in water resistance, alkali resistance, acid resistance, and the like.

When the number of the alkoxysilyl groups in the alkoxysilyl group-containing acrylic copolymer (B) is less than one in one molecule, it becomes easy to lower the solvent resistance of the film obtained from the composition of the present invention.

The number average molecular weight of the alkoxysilyl group-containing acrylic copolymer (B) is from 1,000 to 30,000, particularly preferably from 3,000 to 25,000, from the viewpoint of the properties such as durability of the film obtained from the composition of the present invention.

The alkoxysilyl group-containing acrylic copolymer (B) can be obtained, for instance, by copolymerization of acrylic acid, methacrylic acid or a derivative therefrom with an alkoxysilyl group-containing monomer.

The derivatives of acrylic acid or methacrylic acid are not limited. Examples thereof are, for instance, methyl (meth)acrylate, ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, α-ethyl (meth)acrylamide, N-butoxymethyl (meth)acrylamide, N,N-dimethyl acrylamide, N-methyl acrylamide, acryloyl morpholine, 2-hydroxyethyl (meth)acrylate, 2-hydroxypropyl (meth)acrylate, N-methylol (meth)acrylamide, Aronix M-5700 made by Toagosei Chemical Industry Co., Ltd., AS-6, AN-6, AA-6, AB-6, and AK-5, which are macromers made by Toagosei Chemical Industry Co., Ltd., Placcel FA-1, Placcel FA-4, Placcel FM-1 and Placcel FM-4, which are products made by Daicel Chemical Industries, Ltd., a phosphate group-containing vinyl compound which is a condensation product of a hydroxyalkyl ester of α,β- ethylenically unsaturated carboxylic acid such as a hydroxyalkyl ester of (meth)acrylic acid with phosphoric acid or a phosphoric ester, a (meth)acrylate containing an urethane bond or siloxane bond, and the like. When the hydroxyl group-containing monomer is used, it is preferable to use it in a small amount (for instance, not more than 2% of the copolymer).

The above-mentioned alkoxysilyl group-containing monomers are not particularly limited so long as the monomer has a polymerizable unsaturated double bond and has the alkoxysilyl group. Examples thereof are, for instance,

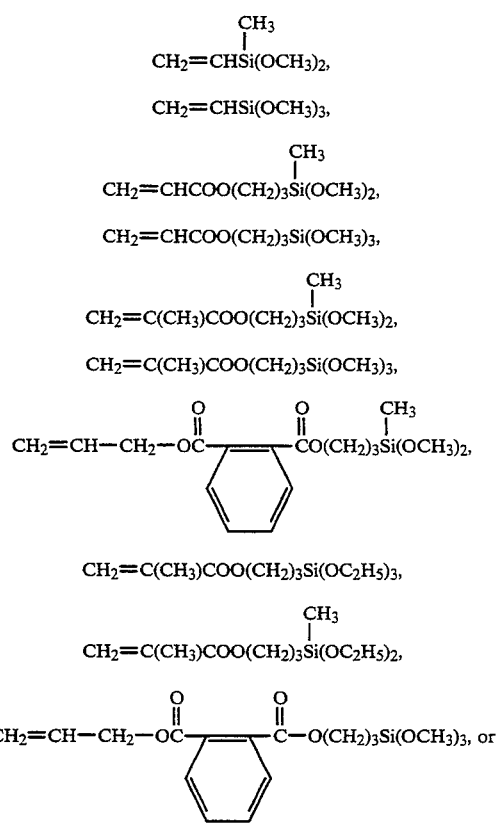

a (meth)acrylate having the alkoxysilyl group at the molecular ends through an urethane bond or a siloxane bond such as

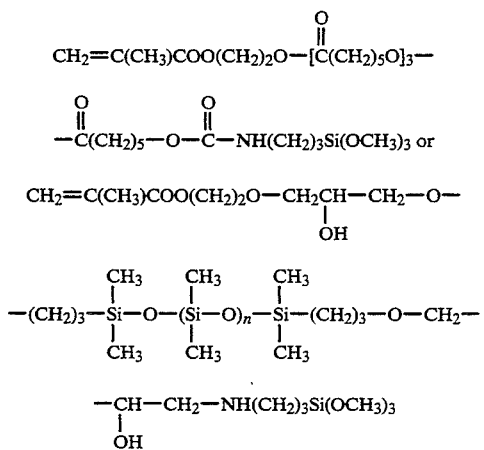

and the like.

It is preferable that the alkoxysilyl group-containing acrylic copolymer (B) contains from 5 to 90%, more preferably from 11 to 70%, of units of the alkoxysilyl group-containing monomer, from the viewpoint of the curability of the composition and the durability of the film.

The copolymer may contain segments formed by an urethane bond or siloxane bond or segments derived from monomers other than the (meth)acrylic acid derivative in its main chain within a range of less than 50%. The monomers are not limited. Examples of the monomers are, for instance, an aromatic hydrocarbon vinyl compound such as styrene, α-methylstyrene, chlorostyrene, styrenesulfonic acid, 4-hydroxystyrene or vinyl toluene; an unsaturated carboxylic acid such as maleic acid, fumaric acid or itaconic acid, its salt (alkali metal salt, ammonium salt, amine salt), its acid anhydride (maleic anhydride), an ester of an unsaturated carboxylic acid such as a diester or half ester thereof with a linear or branched alcohol having 1 to 20 carbon atoms; a vinyl ester or an allyl compound such as vinyl acetate, vinyl propionate or diallyl phthalate; an amino group-containing vinyl compound such as vinylpyridine or aminoethyl vinyl ether; an amide group-containing vinyl compound such as itaconic acid diamide, crotonamide, maleic acid diamide, fumaric acid diamide or N-vinylpyrrolidone; other vinyl compounds such as 2-hydroxyethyl vinyl ether, methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

The alkoxysilyl group-containing acrylic copolymer (B) can be prepared, for instance, in a manner as shown in Japanese Unexamined Patent Publication No. 54-36395, No. 57-36109, No. 58-157810, and the like. A solution polymerization using an azo radical polymerization intiator such as azobisisobutyronitrile is the most preferable, from the viewpoint of the easiness of synthesis.

If necessary, in the above-mentioned solution polymerization, there is used a chain transfer agent such as n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, (CH$_3$O)$_3$Si—S—S—Si—(OCH$_3$)$_3$ and (CH$_3$O)$_3$Si-—S$_8$—Si(OCH$_3$)$_3$, whereby the molecular weight can be controlled. Particularly, when using the chain transfer agent having the alkoxysilyl group in its molecule, such as γ-mercaptopropyltrimethoxysilane, it is possible to introduce the alkoxysilyl group into the silyl group-containing acrylic copolymer at the polymer ends.

As the polymerization solvents used in the above-mentioned solution polymerization, there are used any non-reactive solvents such as hydrocarbons (toluene, xylene, n-hexane and cyclohexane), acetic esters (ethyl acetate and butyl acetate), alcohols (methanol, ethanol, isopropanol and n-butanol), ethers (ethyl cellosolve, butyl cellosolve and cellosolve acetate), and ketones (methyl ethyl ketone, ethyl acetoacetate, acetylacetone, diacetone alcohol, methyl isobutyl ketone and acetone) without particular restrictions.

The alkoxysilyl group-containing polymer (B) may be used alone or as a mixture thereof.

The ratio of the alkoxysilyl group-containing polymer (B) used is not particularly limited. It is preferable that the ratio of the component (A)/the component (B) is from 9/1 to 1/9, more preferably from 8/2 to 2/8 in weight ratio. When the ratio of the component (A)/the component (B) is more than 9/1, the film obtained from the composition of the present invention tends to lower in water resistance. When the ratio is less than 1/9, there is a tendency that the effects obtained by addition of the component (A) are unsatisfactorily obtained.

Examples of the curing catalyst used in the present invention which is the component (C) [hereinafter also referred to as "curing catalyst (C)"] are, for instance, an organotin compound such as dibutyl tin dilaurate, dibutyl tin dimaleate, dioctyl tin dilaurate, dioctyl tin dimaleate or tin octoate; phosphoric acid or a phosphoric ester such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; an addition reaction product of phosphoric acid and(or) monoacid phosphate with an epoxy compound such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane,

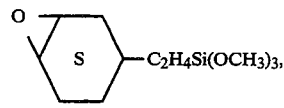

Cardula E made by Yuka Shell Epoxy Kabushiki Kaisha, or Epicote 828 or Epicote 1001, which is a product made by Yuka Shell Epoxy Kabushiki Kaisha; an organic titanate compound; an organic aluminum compound; an acidic compound such as maleic acid, adipic acid, azelaic acid, sebacic acid, itaconic acid, citric acid, succinic acid, phthalic acid, trimellitic acid, pyromellitic acid, their acid anhydrides or p-toluenesulfonic acid; mines such as hexylamine, di-2-ethylhexylmine, N,N-dimethyldodecylamine or dodecylamine; a mixture or a reaction product of the amine with the acid phosphate; an alkali compound such as sodium hydroxide or potassium hydroxide; and the like.

Among these curing catalysts (C), the preferable ones are the organotin compound, the acid phosphate, the mixture or the reaction product of the acid phosphate and the amine, the saturated or unsaturated polyvalent carboxylic acid or its acid anhydride, the reactive silicon compound, the organic titanate compound, the organic aluminum compound, and the mixture thereof, because of their high activity.

The curing catalyst (C) may be used alone or as a mixture thereof.

The amount of the component (C) is not particularly limited. The amount is usually from 0.1 to 20 parts (parts by weight, hereinafter the same), preferably from 0.1 to 10 parts, based on 100 parts of the solid matter of the component (A) and the component (B). When the used mount of the component (C) is less than 0.1 part, the curability tends to lower. When the amount is more than 20 parts, the appearance of the film tends to lower.

In the composition of the present invention, the dehydrating agent (D) and/or the alkyl alcohol (E) are included as the stabilizing agent.

Examples of the dehydrating agents which is the component (D) are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysilane, methyl silicate and ethyl silicate, and the like. These hydrolyzable ester compounds may be added before, after or during the polymerization of the alkoxysilyl group-containing acrylic copolymer (B).

As the dehydrating agent (D), methyl orthoacetate is particularly preferable, since the effect for stabilizing the one component composition is great.

The amount of the dehydrating agent used is not particularly limited. The mount is usually not more than 100 parts, preferably not more than 50 parts, based on 100 parts of the solid matter of the components (A) and (B). When the dehydrating agent is used alone, without using the alkyl alcohol (E), the mount is usually from 0.5 to 100 parts, preferably from 1 to 50 parts, more preferably from 5 to 30 parts.

The effect can be further increased by using a dehydrating accelerator when the dehydrating agent is used.

Preferable examples of the dehydrating accelerators are, for instance, an inorganic acid such as hydrochloric acid, sulfuric acid, phosphoric acid or nitric acid; an organic acid such as formic acid, acetic acid, oxalic acid, benzoic acid, phtharic acid, p-toluenesulfonic acid, acrylic acid or methacrylic acid; a metal salt of carboxylic acid such as an alkyl titanate or lead octylate; a carboxylic acid organotin compound such as tin octylate, dibutyl tin dilaurate, or dioctyl tin maleate; a sulfide or mercaptide organotin compound such as monobutyl tin sulfide or dioctyl tin mercaptide; an organotin oxide such as dioxtyl tin oxide; an organotin compound obtained by reaction of the organotin oxide with an ester compound such as ethyl silicate, Ethyl Silicate 40, dimethyl maleate or dioctyl phthalate; an amine such as tetraethylenepentamine, triethylenediamine or N-$\beta$-aminoethyl-$\gamma$-aminopropyltrimethyoxysilane; an alkali catalyst such as potassium hydroxide or sodium hydroxide; and the like. The agents are not limited thereto. Among them, the organic acids, the inorganic acids and the organotin compounds are particularly effective.

The dehydrating accelerator is used in an amount of from 0.0001 to 20 parts, preferably from 0.001 to 10 parts, based on 100 parts of the dehydrating agent. When the compound which is used also as the component (C) is used as the dehydrating accelerator, the amount is from 0.1 to 20 parts, preferably from 0.1 to 10 parts, in addition to the used amount of the component (C).

As the alkyl alcohol which is the component (E), alcohols wherein an alkyl group has 1 to 10 carbon atoms are preferable. Examples of the alcohols are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like.

The amount of the alcohol (E) used is not particularly limited. The mount is usually not more than 100 parts, preferably not more than 50 parts, based on 100 parts of the solid matter of the components (A) and (B). When the component (E) is used alone, without using the dehydrating agent (D), the amount is usually from 0.5 to 100 parts, preferably from 2 to 50 parts.

When the alkyl alcohol, particularly the alkyl alcohol having 1 to 10 carbon atoms, is used as the component (E) and is used together with the dehydrating agent (D), the storage stability can be remarkably improved compared to the case where the composition comprising the components (A), (B), (C) and (D) is stored.

As the solvent used in the composition of the present invention, any non-reactive solvents can be used.

Examples of such solvents are, for instance, solvents used in general paints or coating agents such as aliphatic hydrocarbons, aromatic hydrocarbons, halogenated hydrocarbons, alcohols, ketones, esters, ethers, alcoholic esters, ketone alcohols, ether alcohols, ketone ethers, ketone esters or ester ethers, and the like.

The amount of the total solvents used varies depending on the molecular weight or composition of the component (A) and the component (B) in the composition of the present invention, so is not decided wholly. The amount is controlled so that the composition has a necessary solid concentration or viscosity for the practical use, and is usually from 250 to 25 parts based on 100 parts of the solid matter.

In order to improve the film properties such as adhesion, hardness and solvent resistance, a hydrolyzable silicon compound can be added to the composition of the present invention. The hydrolyzable silicon compound is a compound having a hydrolyzable silyl group at the ends or side chains, and preferable examples are, for instance, hydrolyzable silane compounds, condensation products of their partial hydrolyzates, their reaction products, their mixture, and the like.

Examples of the silane compounds are, for instance, methyl silicate, methyltrimethoxysilane, ethyltrimethoxysilane, butyltrimethoxysilane, octyltrimethoxysilane, dodecyltrimethoxysilane, phenyltrimethoxysilane, vinyltrimethoxysilane, $\gamma$-methacryloyloxypropyltrimethyoxysilane, $\gamma$-acryloyloxypropyltrimethoxylilane, $\gamma$-glycidoxypropyltrimethoxysilane, $\gamma$-mercaptopropyltrimethoxysilane, $\gamma$-aminopropyltrimethoxysilane, N-$\beta$-aminoethyl-$\gamma$-aminopropyltrimethoxy silane, dimethyldimethoxysilane, diethyldimethoxysilane, dibutyldimethoxysilane, diphenyldimethoxysilane, vinylmethyldimethoxysilane, $\gamma$-methacryloyloxypropylmethyldimethoxysilane, trimethylmethoxysilane, triethylmethoxysilane, triphenylmethoxysilane, ethyl silicate, methyltriethoxysilane, ethyltriethoxysilane, butyltriethoxysilane, octyltriethoxysilane, dodecyltriethoxysilane, phenyltriethoxysilane, vinyltriethoxysilane, $\gamma$-methacryloyloxypropyltriethoxysilane, $\gamma$-acryloyloxypropyltriethoxysilane, $\gamma$-glycidoxypropyltriethoxysilane, $\gamma$-mercaptopropyltriethoxysilane, $\gamma$-aminopropyltriethoxysilane, N-$\beta$-aminoethyl-$\gamma$aminopropyltriethoxysilane, dimethyldiethoxysilane, diethyldiethoxysilane, dibutyldiethoxysilane, diphenyldiethoxysilane, vinylmethyldiethoxysilane, $\gamma$-methacryloyloxypropylmethyldiethoxysilane, trimethylethoxysilane, triethylethoxysilane, triphenylmethoxysilane, and the like.

The condensation product of the partial hydrolyzate of the hydrolyzable silane compund can be easily produced by mixing one or more silane compounds as mentioned above with a necessary mount of H$_2$O and, if necessary, a small mount of a condensation catalyst such as hydrochloric acid or sulfuric acid, and advancing the condensation reaction at room temperature to 100° C. while removing the produced alcohol. Examples of the condensation products of partial hydrolyzate of methyl silicate, having methoxysilyl group are, for instance, Methyl Silicate 47, Methyl Silicate 51, Methyl Silicate 55, Methyl Silicate 58 and Methyl Silicate 60, which are products made by Nippon Colcoat Kagaku Kabushiki Kaisha, and the like. Examples of the condensation products of partial hydrolyzate of methyltrimethoxysilane or dimethyldimethoxysilane, having methoxysilyl group are, for instance, AFP- 1, AFR- 2, AFP-6, KR213, KR217 and KR9218, which are products made by Shin-Etsu Chemical Co., Ltd.; TSR165 and TR3357, which are products made by Toshiba Silicone Co., Ltd.; Y-1587, FZ-3701 and FZ-3704, which are products made by Nippon Unicar Kabushiki Kaisha, and the like. Examples of the condensation products of partial hydrolyzate of ethyl silicate, having ethoxysilyl group are, for instance, Ethyl Silicate 40, HAS-1, HAS-6 and HAS-10, which are products made by Nippon Colcoat Kagaku Kabushiki Kaisha, and the like.

Examples of the reaction products of the above-mentioned hydrolyzable silane compound are, for instance, a reaction product of a silane coupling agent containing amino group with a silane coupling agent containing epoxy group; a reaction product of a silane coupling agent containing amino group with a compound containing epoxy group such as ethylene oxide, butylene oxide, epichlorohydrine, epoxidated soybean oil, in addition, Epicoat 828 and Epicoat 1001, which are products made by Yuka Shell Epoxy Kabushiki Kaisha; a reaction product of a silane coupling agent containing epoxy group with an amine such as an aliphatic amine, e.g. ethyl amine, diethyl amine, triethyl amine, ethylene diamine, hexane diamine, diethylene triamine, triethylene tetramine or tetraethylene pentamine, an aromatic amine, e.g. aniline or diphenyl amine, or an alicyclic amine such as cyclopentyl amine or cyclohexyl amine; and the like.

Such hydrolyzable silicon compounds may be used alone or as a mixture thereof.

The amount of the hydrolyzable silicon compound used is not particularly limited. The amount is usually from 0.01 to 100 parts, preferably from 0.1 to 30 parts, based on 100 parts of the solid matter of the components (A) and (B). When the amount of the hydrolyzable silicon compound used is less than 0.001 part, the addition effects are insufficiently obtained. When the amount is more than 100 parts, the appearance of the film prepared from the composition of the present invention tends to lower.

According to the uses thereof, there can be added to the composition of the present invention, various additives such as diluents, pigments (including extender pigments), ultraviolet absorbers, light stabilizers, agents for preventing precipitation and leveling agents; celluloses such as nitrocellulose and cellulose acetate butyrate; resins such as epoxy resins, melamine resins, vinyl chloride resins, chlorinated polypropylene, chlorinated rubbers and polyvinyl butyral; fillers, and the like.

Next, the preparation method of the composition of the present invention is explained.

The preparation method is not particularly limited. For instance, the component (A) and the component (B) are cold-blended, or they are mixed, then heated (hot-blended) to partially react them, and the component (C) and the components (D) and/or (E) are mixed therewith to prepare the composition of the present invention.

The thus prepared composition of the present invention is a composition utilizing the crosslinking reaction wherein the hydroxyl group of the acrylic resin having hydroxyl group (A) reacts with the silyl group of the alkoxysilyl group-containing polymer (B), and is clearly distinct from conventional techniques using a melamine as the crosslinking agent.

The composition of the present invention is excellent in storage stability due to the effects by the dehydrating agent (D) and the alkyl alcohol (E).

Such compositions of the present invention are suitable for use as coating agents used for various coatings such as coating for outer walls of buildings, automobiles, industrial machines, steel furnitures, household electric appliances and plastics, particularly, coating for use requiring to have excellent durability. The composition is applied to a substrate in a usual manner such as dipping, spraying or brushing, then is cured at usually not less than 30° C., preferably from 55° to 350° C. to give a coating film having excellent durability.

BEST MODE FOR CARRYING OUT THE INVENTION

The composition of the present invention is more specifically explained by means of Examples in which all part and % are part by weight and % by weight unless otherwise noted.

Preparation Example 1

Synthesis of an Alkoxysilyl Group-Containing Polymer (B)

A reaction vessel equipped with a stirrer, a thermometer, a condenser, a nitrogen inlet tube and a dropping funnel was charged with 45.9 parts of xylene, and the temperature was elevated to 100° C., while introducing nitrogen gas thereto. A mixture (b) having a composition shown below was added dropwise at a uniform velocity through the dropping funnel over 5 hours.

Mixture (b)

| | |
|---|---|
| Styrene | 12.8 parts |
| Methyl methacrylate | 50.1 parts |
| Stearyl methacrylate | 6.9 parts |
| γ-Methacryloyloxypropyltrimethoxysilane | 30.2 parts |
| Xylene | 13.5 parts |
| 2,2'-Azobisisobutyronitrile | 4.5 parts |

After completing the dropping addition of the mixture (b), 0.5 part of 2,2'-azobisisobutyronitrile and 5 parts of toluene were added dropwise at a uniform velocity over 1 hour. After completing the dropping addition, it was aged at 110° C. over 2 hours, then was cooled down and xylene was added to the resin solution so as to adjust the solid content to 60%. The properties of the resin solution (1) are shown in Table 1.

Preparation Example 2

Synthesis of an Acrylic Resin Having Hydroxyl Group (A-1)

The reaction vessel was charged with 31.3 parts of butyl acetate and 9.5 parts of xylene instead of 45.9 parts of xylene, and a mixture (a-1) having the following composition was added in the same manner as in Preparation Example 1.

Mixture (a-1)

| | |
|---|---|
| Xylene | 18 parts |
| Styrene | 28.3 parts |
| Methyl methacrylate | 7.1 parts |
| n-Butyl acrylate | 32.5 parts |
| Methacrylic acid | 0.3 part |
| Placcel FM-1*[1] | 31.8 parts |

-continued

| | |
|---|---|
| 2,2'-Azobisisobutyronitrile | 4.5 parts |

[Note]
*1: Addition reaction product of 2-hydroxyethyl methacrylate/ε-caprolactone = 1:1 made by Daicel Chemical Industries, Ltd.

After completing the dropping addition of the mixture (a-1), 0.2 part of 2,2'-azobisisobutyronitrile and 3.8 parts of toluene were added dropwise at a uniform velocity over 1 hour. After completing the dropping addition, it was aged at 110° C. for 2 hours, then was cooled down, and xylene was added to the resin solution so as to adjust the resin content to 60%. The properties of the resin solution (2) are shown in Table 1.

Preparation Example 3

Synthesis of an Acrylic Resin Having Hydroxyl Group (A-2)

The reaction vessel was charged with 31.3 parts of butyl acetate and 9.5 parts of xylene instead of 45.9 parts of xylene, and a mixture (a-2) having the following composition was added in the same manner as in Preparation Example 1.

Mixture (a-2)

| | |
|---|---|
| Xylene | 18 parts |
| Styrene | 28.3 parts |
| Methyl methacrylate | 4.4 parts |
| n-Butyl acrylate | 32.5 parts |
| Acrylic acid | 3 parts |
| Placcel FM-1*1 | 31.8 parts |
| 2,2'-Azobisisobutyronitrile | 4.5 parts |

[Note]
*1: Addition reaction product of 2-hydroxyethyl methacrylate/ε-caprolactone = 1:1 made by Daicel Chemical Industries, Ltd.

After completing the dropping addition of the mixture (a-2), 0.2 part of 2,2'-azobisisobutyronitrile and 3.8 parts of toluene were added dropwise at a uniform velocity over 1 hour. After completing the dropping addition, it was aged at 110° C. for 2 hours, then was cooled down, and xylene was added to the resin solution so as to adjust the resin content to 60%. The properties of the resin solution (3) are shown in Table 1.

TABLE 1

| Resin solution | (1) | (2) | (3) |
|---|---|---|---|
| Property | | | |
| Non-volatile matter (%) | 60 | 60 | 60 |
| Viscosity (28° C., cps) | 900 | 850 | 980 |
| Acid value (mgKOH/g solid) | 0 | 2.0 | 23 |
| Hydroxyl value (mgKOH/g solid) | 0 | 73 | 73 |
| Number average molecular weight | 6.000 | 6.000 | 6.000 |
| Hue (Gardner) | <1 | <1 | <1 |

Examples 1–8 and Comparative Examples 1–3

Using the each resin solution obtained in Preparation Examples 1–3, a composition as shown in Tables 2 and 3 was prepared.

The obtained composition was subjected to a storage test wherein it was allowed to stand at 50° C. for 7 days or for 14 days under sealing. The viscosities before storage and after storage were measured at 23° C. by using a Brook-field type viscometer. The results are shown in Tables 2 and 3.

TABLE 2

| Ex. No. | 1 | 2 | 3 | 4 | Com. Ex. 1 | Com. Ex. 2 |
|---|---|---|---|---|---|---|
| Composition (part) | | | | | | |
| Resin solution (1) | 36.0 | 36.0 | 36.0 | 36.0 | 36.0 | 36.0 |
| Resin solution (2) | 24.0 | 24.0 | 24.0 | 24.0 | 24.0 | 24.0 |
| Dehydrating agent*2 | 1.8 | 1.8 | 1.8 | 0 | 0 | 0 |
| Dehydrating accelerator*3 | 0.1 | 0 | 0 | 0 | 0 | 0 |
| Methanol | 1.8 | 1.8 | 0 | 1.8 | 0 | 0 |
| n-Butanol | 3.6 | 3.6 | 0 | 3.6 | 0 | 0 |
| Xylene | 31.26 | 32.08 | 37.48 | 33.88 | 48.56 | 39.28 |
| TN801*4 | 0.72 | 0 | 0.72 | 0 | 0.72 | 0 |
| DP8R*5 | 0 | 0.36 | 0 | 0.36 | 0 | 0.36 |
| FARMIN DM20*6 | 0 | 0.36 | 0 | 0.36 | 0 | 0.36 |
| Hydrolyzable silicon compound*7 | 0.72 | 0 | 0 | 0 | 0.72 | 0 |
| Total | 100.0 | 100.0 | 100.0 | 100.0 | 110.0 | 100.0 |
| Composition solid concentration (%) | 36.0 | 36.0 | 36.0 | 36.0 | 32.7 | 36.0 |
| Estimation results | | | | | | |
| Initial viscosity (cps) | 25.0 | 26.0 | 33.0 | 25.0 | 26.5 | 33.5 |
| Viscisity after storage | | | | | | |
| 50° C. × 7 days (cps) | 26.0 | 33.0 | 52.0 | 38.5 | Gelation | Gelation |
| 50° C. × 20 days (cps) | 27.0 | 38.5 | 65.0 | 42.5 | — | — |

[Notes]
*2Methyl orthoacetate
*31% Methanol solution of concentrated hydrochloric acid
*4Dioctyl tin maleate made by Sakai Kagaku Kogyo Kabushiki Kaisha
*5Dioxtyl acid phosphate made by Kabushiki Kaisha Daihachi Kagaku Kogyosho
*6N,N-Dimethyl dodecyl amine made by Kao Kabushiki Kaisha
*7A reaction product of an aminosilane (A-1120 made by UCC) and an epoxysilane (A187 made by UCC)

TABLE 3

| Ex. No. | 5 | 6 | 7 | 8 | Com. Ex. 3 |
|---|---|---|---|---|---|
| Composition (part) | | | | | |
| Resin solution (1) | 36.0 | 36.0 | 36.0 | 36.0 | 36.0 |
| Resin solution (3) | 24.0 | 24.0 | 24.0 | 24.0 | 24.0 |

TABLE 3-continued

| Ex. No. | 5 | 6 | 7 | 8 | Com. Ex. 3 |
|---|---|---|---|---|---|
| Dehydrating agent (1)*2 | 1.8 | 7.2 | 0 | 0 | 0 |
| Dehydrating agent (2)*8 | 0 | 0 | 7.2 | 0 | 0 |
| Dehydrating agent (3)*9 | 0 | 0 | 0 | 7.2 | 0 |
| Methanol | 1.8 | 1.8 | 1.8 | 1.8 | 0 |
| n-Buthanol | 3.6 | 3.6 | 3.6 | 3.6 | 0 |
| Xylene | 38.0 | 32.7 | 32.7 | 32.7 | 55.4 |
| DP8R*5 | 0.36 | 0.36 | 0.36 | 0.36 | 0.36 |
| FARMIN DM20*6 | 0.36 | 0.36 | 0.36 | 0.36 | 0.36 |
| Total | 105.9 | 105.9 | 105.9 | 105.9 | 116.1 |
| Composition solid concentration (%) | 34 | 34 | 34 | 34 | 31 |
| Estimation results | | | | | |
| Initial viscosity (cps) | 27.0 | 26.0 | 26.0 | 27.0 | 27.0 |
| Viscosity after storage | | | | | |
| 50° C. × 7 days (cps) | 35.0 | 27.0 | 30 | 33 | Gelation |
| 50° C. × 20 days (cps) | 40.0 | 28.0 | 34 | 38 | — |

[Notes]
*2Methyl orthoacetate
*5Dioxtyl acid phosphate made by Kabushiki Kaisha Daihachi Kagaku Kogyosho
*6N,N-Dimethyl dodecyl amine made by Kao Kabushiki Kaisha
*8Methyl orthoformate
*9Methyltrimethoxysilane From the estimation results of Table 2 and Table 3, it would be recognized that the composition of the present invention is the one component composition improved in storage stability.

We claim:

1. A one component composition comprising:
   (A) an acrylic resin having hydroxyl group,
   (B) an alkoxysilyl group-containing acrylic copolymer having a group represented by the formula:

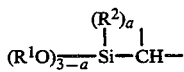

wherein $R^1$ is an alkyl group having 1 to 10 carbon atoms, $R^2$ is a hydrogen atom or a monovalent hydrocarbon group having 1 to 10 carbon atoms selected from the group consisting of an alkyl group, an aryl group and an aralkyl group, and a is 0, 1 or 2,
   (C) a curing catalyst, and
   at least one member selected from the group consisting of (D) a dehydrating agent and (E) an alkyl alcohol.

2. A one component composition comprising:
   A) an acrylic resin having hydroxyl group,
   (B) an alkoxysilyl group-containing acrylic copolymer having a group represented by the formula:

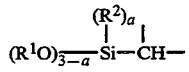

wherein $R^1$ is an alkyl group having 1 to 10 carbon atoms, $R^2$ is a hydrogen atom or a monovalent hydrocarbon group having 1 to 10 carbon atoms selected from the group consisting of an alkyl group, an aryl group and an aralkyl group, and a is 0, 1 or 2.
   (C) a curing catalyst, and
   (E) a combination of effective amounts of methanol and butanol for stabilizing said composition and maintaining said composition in an uncured state for at least a week.

3. The composition of claim 2, wherein said composition contains (D) a dehydrating agent.

4. The composition of claim 3, wherein said composition contains said dehydrating agent, said combination of methanol and butanol and 0.0001 to 20 parts by weight of a dehydrating accelerator per 100 parts by weight of said dehydrating agent.

5. A one component composition capable of coating a substrate one week after mixing which comprises:
   (A) an acrylic resin having a hydroxyl group
   (B) an alkoxysilyl group-containing acrylic copolymer having a group represented by the formula:

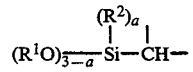

wherein $R^1$ is an alkyl group having 1 to 10 carbon atoms, $R^2$ is a hydrogen atom or a monovalent hydrocarbon group having 1 to 10 carbon atoms selected from the group consisting of an alkyl group, an aryl group and an aralkyl group, and a is 0, 1 or 2,
   (C) an effective mount of a curing catalyst for curing said composition, and effective amounts of (D) a dehydrating agent and (E) an alkyl alcohol for stabilizing said composition.

6. The composition of claim 5, wherein said acrylic resin (A) and said alkoxysilyl group-containing acrylic copolymer (B) are present in a ratio of 9/1 to 1/9.

7. The composition of claim 5, wherein said composition contains 0.5 to 100 parts by weight of said dehydrating agent (D) and 0.5 parts by weight of an alkyl alcohol having 1 to 10 carbon atoms, respectively, per 100 parts by weight of total solid matter of said components (A) and (B).

8. The composition of claim 5, wherein said composition contains 0.5 to 100 parts by weight of said dehydrating agent (D) and 0.5 parts by weight of an alkyl alcohol having 1 to 10 carbon atoms, respectively, per 100 parts by weight of total solid matter of said components (A) and (B), and 0.0001 to 20 parts by weight of a dehydrating accelerator per 100 parts by weight of said dehydrating agent (D).

9. The one component composition of claim 5, wherein said component (A), the acrylic resin having hydroxyl group has a hydroxyl value of 10 to 300 mg KOH/g and a number average molecular weight of 1,500 to 40,000.

10. The one component composition of claim 5, wherein said component (B), the alkoxysilyl group-containing acrylic copolymer is a polymer containing 5 to 90% by weight of units of an alkoxysilyl group-containing monomer having a polymerizable unsaturated double bond and an alkoxysilyl group in its molecule.

11. The one component composition of claim 5, wherein said component (C), the curing catalyst is an organotin compound, an acid phosphate, a mixture or a reaction product of an acid phosphate and an amine, a saturated or unsaturated polyvalent carboxylic acid, an acid anhydride of a saturated or unsaturated polyvalent carboxylic acid, a reactive silicon compound, an organic titanate compound, an organic aluminum compound, or a mixture thereof.

12. The one component composition of claim 5, wherein said component (D), the dehydrating agent is a hydrolyzable ester compound.

13. The one component composition of claim 5, wherein said component (E), the alkyl alcohol is an alkyl alcohol having an alkyl group with 1 to 10 carbon atoms.

14. The one component composition of claim 5, which contains a hydrolyzable ester compound as said component (D), the dehydrating agent and an alkyl alcohol wherein an alkyl group has 1 to 10 carbon atoms as said component (E).

15. The one component composition of claim 5, which contains a hydrolyzable ester compound as said component (D), the dehydrating agent, the alkyl alcohol of said component (E) and further a dehydrating accelerator.

16. The one component composition of claim 5, wherein said component (D), the dehydrating agent is methyl orthoacetate.

* * * * *